(12) United States Patent
Kaguma et al.

(10) Patent No.: US 11,429,565 B2
(45) Date of Patent: Aug. 30, 2022

(54) TERMS OF SERVICE PLATFORM USING BLOCKCHAIN

(71) Applicant: International Business Machines Corporation, Armonk, NY (US)

(72) Inventors: David W. Kaguma, Nairobi (KE); Clifford A. Pickover, Yorktown Heights, NY (US); Maja Vukovic, New York, NY (US); Komminist Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 15/988,062

(22) Filed: May 24, 2018

(65) Prior Publication Data

US 2019/0361992 A1   Nov. 28, 2019

(51) Int. Cl.
| | |
|---|---|
| *H04L 9/06* | (2006.01) |
| *G06F 16/18* | (2019.01) |
| *H04L 9/32* | (2006.01) |
| *G06F 16/951* | (2019.01) |

(52) U.S. Cl.
CPC ........ *G06F 16/1805* (2019.01); *G06F 16/951* (2019.01); *H04L 9/0637* (2013.01); *H04L 9/32* (2013.01); *H04L 2209/38* (2013.01)

(58) Field of Classification Search
CPC ..... G06F 16/1805; G06F 16/951; H04L 9/32; H04L 9/0637; H04L 2209/38; H04L 9/3239; G06Q 20/38
USPC .......................................................... 705/64
See application file for complete search history.

(56) References Cited

U.S. PATENT DOCUMENTS

| | | | |
|---|---|---|---|
| 8,954,988 B1 | 2/2015 | Laredo et al. | |
| 2013/0282748 A1 | 10/2013 | Liensberger et al. | |
| 2014/0214915 A1 | 7/2014 | Dragon et al. | |
| 2014/0278730 A1* | 9/2014 | Muhart | G06Q 10/0635 705/7.28 |
| 2015/0262137 A1 | 9/2015 | Armstrong | |
| 2016/0125172 A1* | 5/2016 | Fuller | G06F 21/105 726/26 |
| 2016/0253672 A1* | 9/2016 | Hunter | G06Q 20/4016 705/39 |

(Continued)

FOREIGN PATENT DOCUMENTS

WO    WO-2017190175 A1  *  11/2017  ............. G06Q 20/04

OTHER PUBLICATIONS

"Methodology and Procedure for Secure Granular Authorization and Audit Implementation in Distributed Enterprise Computing Environment"; ip.com; IPCOM000237293D; Publication Date: Jun. 11, 2014; pp. 18. (Year: 2014).*

(Continued)

*Primary Examiner* — Jay Huang
*Assistant Examiner* — Duan Zhang
(74) *Attorney, Agent, or Firm* — Alex Harvey

(57) ABSTRACT

A system, method and program product for implementing a terms of service (ToS) platform. A system is provided that includes a resource tracking system for storing and updating a ToS for a resource according to a defined format in a blockchain; a detector system for detecting transactions associated with the resource; a system for validating a detected transaction relative to the ToS; and a system for composing and storing details associated with the detected transaction in the blockchain.

20 Claims, 3 Drawing Sheets

(56) References Cited

U.S. PATENT DOCUMENTS

| | | | |
|---|---|---|---|
| 2016/0261690 A1 | 9/2016 | Ford | |
| 2016/0292672 A1 | 10/2016 | Fay et al. | |
| 2018/0191503 A1* | 7/2018 | Alwar | H04L 9/0637 |
| 2019/0312910 A1* | 10/2019 | Convertino | G06F 16/24578 |

OTHER PUBLICATIONS

"Docracy Helps You Track Changes in Online Terms of Service"; Advocate's Studio; Musings on Technology in the Law, Research and Writing; Feb. 21, 2013; pp. 2. (Year: 2013).*

"After Instagram controversy, a watchdog site tracks shifting Terms of Service"; The Verge; Feb. 6, 2013; Copyright 2018 Vox Media, Inc.; (Year: 2013).*

Disclosed Anonymously; "Methodology and Procedure for Secure Granular Authorization and Audit Implementation in Distributed Enterprise Computing Environment"; ip.com; IPCOM000237293D; Publication Date Jun. 11, 2014; pp. 18.

Disclosed Anonymously; "Enhanced Services for Manufacturers and Partners: Supply Chain Management Tools Offering Visibility, Tracking, and Payment Services"; ip.com; IPCOM000191159D; Publication Date: Dec. 18, 2009; pp. 14.

Disclosed Anonymously; "System and Method for Software Asset Management Powered by Blockchain and Smart Contracts"; ip.com; IPCOM000248083D; Publication Date: Oct. 24, 2016; pp. 6.

Trivedi, Aman et al.; "Tracxn Report Block Chain Application"; Tracxn; Jul. 2016; pp. 158.

Unknown; "Docracy Helps You Track Changes in Online Terms of Service"; Advocate's Studio; Musings on Technology in the Law, Research and Writing; Feb. 21, 2013; pp. 2.

Brandom, Russell; "After Instagram controversy, a watchdog site tracks shifting Terms of Service"; The Verge; Feb. 6, 2013; Copyright 2018 Vox Media, Inc.

* cited by examiner

TERMS OF SERVICE PLATFORM USING BLOCKCHAIN

TECHNICAL FIELD

The subject matter of this invention relates to terms of services (ToS) for computing resources, and more particularly to a system and method of verifying and tracking terms of service of a resource using blockchain.

BACKGROUND

Many computing resources, such as cloud platforms, application programming interfaces (API), etc., are governed by a terms of service. For instance, an API may include a set of subroutine definitions, protocols, and tools for building software and applications. An API makes it easier to develop a program by providing all the building blocks, which are then put together by the programmer. An API may be for a Web-based system, an operating system, a database system, computer hardware, a software library, etc. In a Web or cloud environment, an application or system can be built from APIs offered by different service providers. Multiple APIs may be combined into a composite API based on the intended use, e.g., allowing a user to access multiple datasets using a single query.

As noted, such resources are generally governed by a set of rules, policies, regulatory framework, privacy protocols, disclaimers, etc., referred to as a terms of service (ToS). For example, if a developer wants to include a third party mapping API in their application (i.e., App) to display a visual map, the developer's code and App must adhere to the ToS of the third party. For instance, the ToS may require that the mapping API not be used to store location details of the users for more the 48 hours.

A significant challenge however for both API providers and developers is to provide a mechanism for ensuring compliance. In many cases, the ToS may evolve over time such that a developer may be in compliance and then out of compliance without realizing the change. Further, APIs can be "mashed" together to create a composite API though API service composition methods. These methods take the building blocks of APIs such as the URLs, paths, and operations (e.g., to get, add, update, delete, etc.), and mash them by mixing and matching with different configurations. Managing ToS in these situations becomes even more complex.

SUMMARY

Aspects of the disclosure provide a terms of service (ToS) platform using a blockchain to manage ToS for resources, and to validate transactions relative to the ToS. Additionally, end users such as developers can access the blockchain to, e.g., assess risks associated with using the resource.

A first aspect discloses a system for implementing a terms of services (ToS) platform, comprising: a resource tracking system for storing and updating a ToS for a resource according to a defined format in a blockchain; a detector system for detecting transactions associated with the resource; a system for validating a detected transaction relative to the ToS; and a system for composing and storing details associated with the detected transaction in the blockchain.

A second aspect discloses a method of implementing a terms of services (ToS) platform, comprising: storing a ToS for a resource according to a defined format in a blockchain; detecting transactions associated with the resource; validating a detected transaction relative to the ToS; and composing and storing details associated with the detected transaction in the blockchain.

A third aspect discloses a computer program product stored on a computer readable storage medium, which when executed by a computing system, provides a terms of service (ToS) platform, the program product comprising: program code that stores and updates a ToS for a resource according to a defined format in a blockchain; program code for detecting transactions associated with the resource; program code for validating a detected transaction relative to the ToS; and program code for composing and storing details associated with the detected transaction in the blockchain.

BRIEF DESCRIPTION OF THE DRAWINGS

These and other features of this invention will be more readily understood from the following detailed description of the various aspects of the invention taken in conjunction with the accompanying drawings in which.

Figure 1:
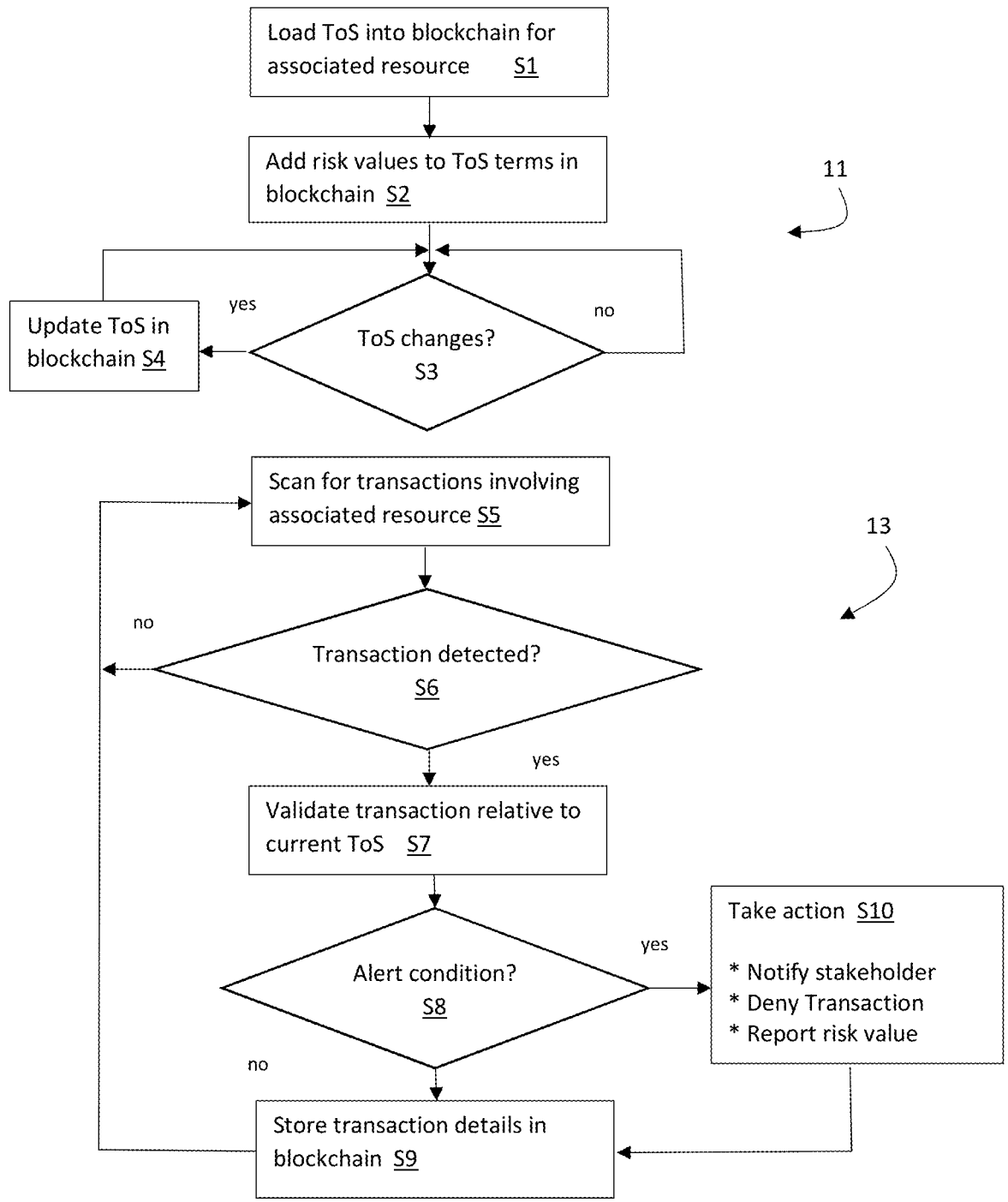
FIG. 1 shows a flow diagram of a ToS platform according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a high level flow diagram of a ToS platform, which generally shows two processes that make use of a blockchain, ToS lifecycle management 11 and transaction validation 13. As shown, ToS lifecycle management 11 includes first loading a ToS into the blockchain for an associated resource at S1. The ToS may be formatted and stored according to a formal representation, e.g., a predefined format, schema, markup language, index, taxonomy, etc., that allows for the automated assessment and quantification of terms of the ToS. At S2, risk values may be associated with terms in the ToS. For example, if the resource allows for the searching of images on the Web, the ToS may state that the developer is solely responsible for any copyright violations that occur as a result of its use. Such a term may be assigned a high risk value.

Once the initial ToS is loaded, the process tracks and manages the ToS to determine whether any terms have been updated, changed, etc., at S3. If yes, the updates are written to the blockchain at S4 and the lifecycle process continues to monitor for changes. Likewise, if no, the lifecycle process continues to monitor for changes. ToS lifecycle management may involve automatically assessing and quantifying terms and risk values from a new or modified ToS using, e.g., natural language processing (NLP), greedy algorithms, machine learning, etc.

Illustrative items that might be included or added to the ToS include: information or codes designating the agreement (general agreement, user eligibility, provider liability), privacy (privacy, confidentiality, third part interactions such as websites), payment (payment, refund, cancelation, suspension/resumption of services, pricing packages), support (warranty, support), Quality of Service (capacity, availability), legal (local restrictions, geo-restrictions), IP (trademark, copyrights), transactions related to ToS such as creating new a ToS, updating/changing existing ToS, accepting ToS, composing ToS, reading ToS, etc.

Other items may automatically be added to the blockchain. For example, changes may occur when computing resources are changed, when computing resources are deemed to be of concern (e.g., possibly unfair or legally risky, based on crowdsource information, etc.), when computing resources in the news suggest a heightened concern for certain ToS terms. Examples of such additions may include: updated definitions of keywords and phrases; user rights and responsibilities; proper or expected usage; accountability for online actions, behavior, and conduct; privacy policy outlining the use of personal data; payment details such as membership or subscription fees, etc.; opt-out policy describing procedure for account termination, if available; disclaimer/limitation of liability clarifying the site's legal liability for damages incurred by users; user notification upon modification of terms, if offered, etc.

Other terms of service information changes may be added to the blockchain as they change through time, such as: copyright licensing on user content; transparency on government or law enforcement requests for content removal; notification of government or third-party requests for personal data; transparency of security practices; etc. In some cases, the change may just involve an alternation or addition to the risk value. Other changes may involve: saved or temporary cookies; data tracking policy and opt-out availability; pseudonym allowance; readability; notification and feedback prior to changes in terms; availability of previous Terms of Service; notification prior to information transfer in event of merger or acquisition; indemnification or compensation for claims against account or content; cancellation or termination of account by user and or service; etc.

Referring again to FIG. 1, the transaction validation process begins at S5 with the platform scanning for transactions involving the associated resource. Scanning may be done in any manner, e.g., detecting when an API was composed or updated, etc. At S6, a determination is made whether a transaction has been detected, and if no, continue scanning at S5. If yes at S6, then the transaction is validated at S7 relative to the current ToS. Validation may include verification, compliance analysis, confirmation, authentication, or any other process that evaluates a detected transaction relative to the ToS. At S8, a determination is made whether an alert condition is detected from the validation process when the transaction is invalid, e.g., not verified, is out of compliance, potentially out of compliance, in violation of terms, has an inconsistency, etc., with the ToS. If an alert condition is detected, then an action is taken at S10, e.g., notifying a stakeholder, denying the transaction, reporting a risk, etc. Regardless of whether an alert condition was issued at S8, the transaction details are stored in the blockchain at S9, and the scanning processes repeats. The type of alert condition may be dependent upon the risk value assigned to the relevant ToS term. For example, a transaction that is out of compliance with a term having a low risk value may be logged for later review, while a transaction that is out of compliance with a term having a high risk value may be denied.

Figure 2:
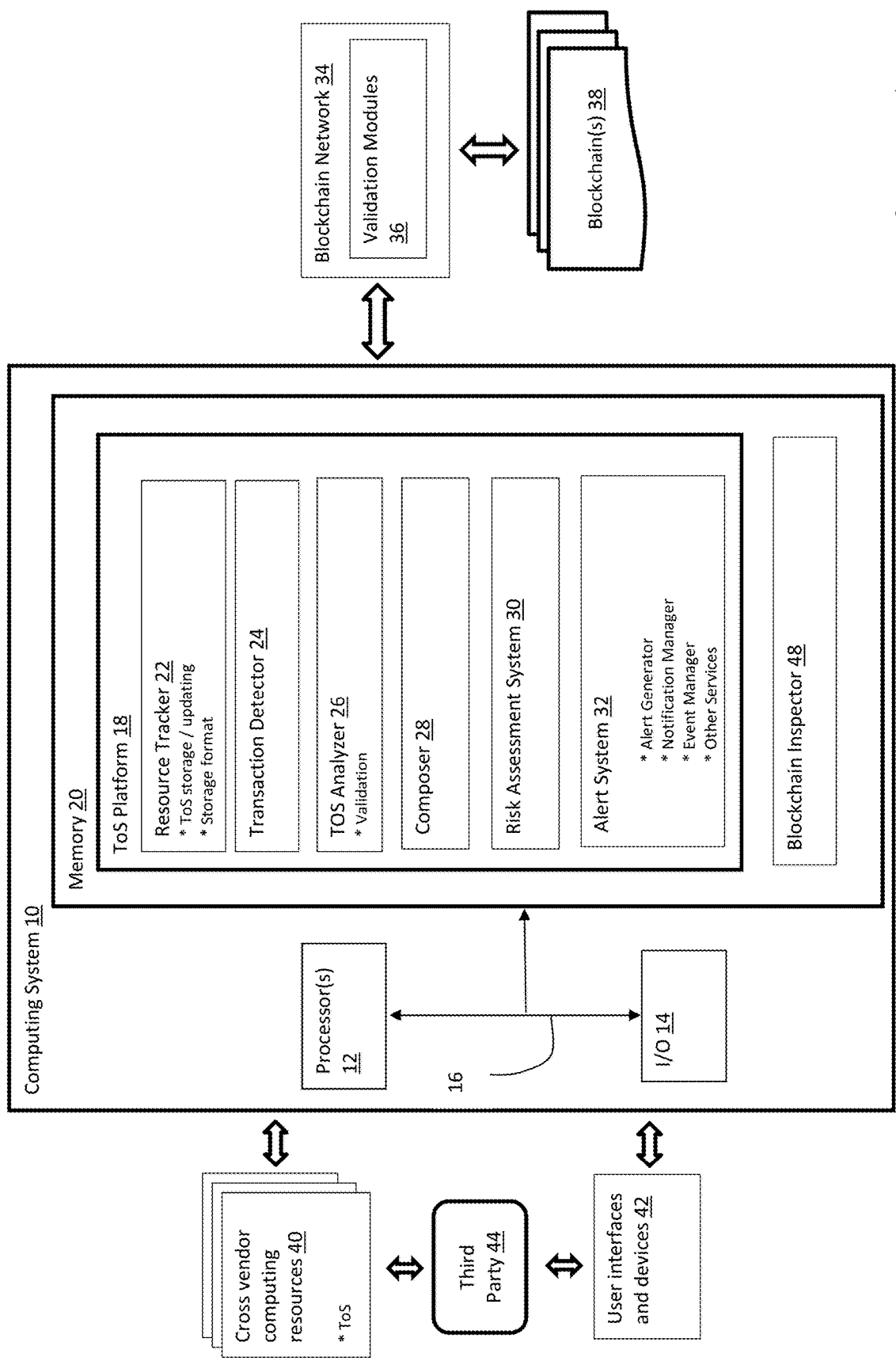
FIG. 2 shows a computing system having a ToS management system according to embodiments.

FIG. 2 depicts a computing system 10 that includes a ToS platform 18 for managing ToS agreements, e.g. from a set of subscribing cross vendor computing resources 40 (e.g., API's, cloud resources, etc.). ToS platform 18 generally includes a resource tracker 22 that tracks each of the different resources 40 and their associated ToS agreements. When a new resource 40 subscribes to the ToS platform 18, the associated ToS is loaded in a blockchain 38 by the resource tracker 22. Similarly, when a ToS is modified or updated, the modifications are likewise loaded into the blockchain by resource tracker 18.

As noted, ToS is stored in blockchain 38 according to a predefined format. For example, a simple ToS may be stored as follows for an API entitled xyz:

```
<ToS> API_xyz
    <Acceptance of Terms>
        <Authority> = implied
        <Contract> = binding
    <Definitions>
        <Data> = any data
            <risk> = 5>
        <Brand> = trademarks
        <License> = non-exclusive
<API use>
    <API modification> = without warning
        <risk> = 8
    <rate limits> = reasonable
<User Data Storage>
    <Caching> = 24 hour update required
    <Security> = strong encryption
<Privacy Policy> = end user privacy policy required
<Government Access> = no surveillance permitted
<Term and Termination> = delete data, remove links
<Warranties> = none
    <risk> = 6
```

As can be seen, major terms are broken out into categories with an assigned value and/or subset of categories. Some of the terms have an included risk value. Changes or modifications may involving storing a whole new ToS version, or just portions that changed. Obviously, the particular form, implementation and level of detail for storing a ToS involved may vary.

Transaction detector 24 monitors the different resources 40 to detect transactions associated with the resources 40. For example, transaction detector 24 may be integrated into a quality of service (QoS) monitor of, e.g., an API ecosystem or cloud environment, which monitors usage events such as availability, invocations, and response times; as well as capacity events such as CPU usage, RAM usage, storage, network impact, etc. Illustrative transactions may for example involve a third party 44 implementing or modifying a program that calls an API resource, actual use of an API resource, etc. Regardless, when a transaction is detected for a resource 40, ToS analyzer 26 imports the associated ToS from the blockchain 38 and analyzes and validates the detected transaction relative to the ToS to determine if an issue exists. In some embodiments, validation modules 36 may be implemented in blockchain network 34 (e.g., as a chain code or a smart contract) to perform the validation. As noted, validation may comprise verification, confirmation, compliance, etc., which include detecting violations, inconsistencies, risks, etc.

In cases where a group of composite resources are utilized together, multiple ToS blockchains 38 may exist. In this case, resource tracker 22 and transaction detector 24 will determine a responsible resource 40 of a detected transaction, and pull the appropriate ToS from the blockchains 38 (potentially making an educated guess using learning learning as to what ToS should apply), and/or evaluate multiple ToSs.

When an issue with a transaction is detected, alert system 32 is employed to take some action, such as generating an alert to the resource owner and/or third party user. A risk assessment system 30 may be utilized to assign risk values to different terms or elements of the ToS, and then use those risk values to assist the alert system 32. For example, if a low level risk is assigned to a ToS term involving privacy, and the detected transaction is flagged with a privacy concern, then the alert system 32 may elect to only log the issue. Conversely, if a high level risk was assigned to privacy, then an alert could be generated and sent to the appropriate stakeholders, e.g., via user interfaces and devices 42.

Whenever a transaction is detected and evaluated by ToS platform 18, the transaction details are processed by composer 28, which loads the details into the blockchain 38. In this manner, a history of every transaction and resolution is stored in a common format. Composer 28 thus formats the transaction details using a predefined specification for storage in the blockchain 38. Note that the ToS details and associated transaction details may be stored in the same or different blockchains 38.

The transaction details stored in blockchain 38 may, e.g., include an origin of users, which user or resource invoked the resource, nature of the application, connectivity (e.g., VPN detected), etc. Details may also include information related to APIs, user details (e.g., an organization, enterprise, individual user, software agent, etc.) who subscribed to the APIs by accepting ToS, etc. API related information that may be stored includes: building blocks of an API such as the URLs, paths, and operations like get, add, update, and delete, etc.; API hosting environment (and type); transactions related to API usage; list of computing resources attached to the API; database services configured for the APIs to interact; data (historical stored data or generated during runtime); time the APIs interacted or accessed a resource or service; duration the API used a resource, transactions related to reset of the APIs, up/down scaling of resources attached to APIs, adding/removing a new service to the APIs, various forms of API interaction, usage information per resources, device/application interactions information with the user API, billing information associated with the usage, compliance and security information of the APIs, etc.; definition of terms in the API ToS, restrictions on use, rate limits, policies regarding storing data related to geographic data, policies on ownership, indemnification, limitations of liability, etc. The blockchain 38 can thus provide a chronicle of ToS's evolution path through time.

When a transaction occurs, one or more corresponding ToS parameters are sent to one or more validation modules 36. The modules 36 establish a validity of the transaction and generate a new entry in the blockchain 38. Optionally, customized analytics services can be part of a chain codes for detecting, validating, and storing fraudulent activities, etc., by obtaining the ToS historic blockchain values.

The platform 18 may start adding new data in the blockchain 38 based on automatic triggers relating to a concern/risk level (e.g., compromising data, leaking sensitive info/data, etc.), predicted concern level (e.g., cloud maintenance) or a hazard button press. Content may also be automatically added under various circumstances and triggers. As one example, the blockchain 38 can be updated when two users start accessing shared resources, when an application is added, when logging attempts are detected from unfamiliar or unregistered devices or locations, etc. An application connected to the stakeholder resource may have an optional dedicated interface for adding to the block, e.g., a GUI element or a voice command to auto-trigger block addition. For example, a voice recognition algorithm may be utilized to identify and synthesize voice commands that can auto-trigger block additions. This may be further enhanced with the use of voice-enabled devices (e.g., Alexa, Google Home, etc.).

The rate of adding content to the blockchain 38 can automatically change based on, or according to, context, e.g., the platform 18 may update a block more often if cloud maintenance is announced or predicted, if the platform 18 detects a pattern that an API call is related to a risk of leaking sensitive information (e.g., patient records), etc. Further, the platform 18 may update the blockchain 38 more when a system predicts, with a confidence level, that a user attempted to login multiple times, and this may be useful to detect a suspicious logging or impersonation attempt or provide tamper-proof evidence.

The blockchain 38 may also include "grades" (i.e., ratings or evaluations) of ToS features, including grades of how well the ToS respects user rights with respect to data use, data disclosures, amendment and termination, etc. Grading may be done in an automated fashion based on a cost-benefit analysis of respecting user rights for data use, data disclosures, amendments, terminations, etc.

Also included in computing system 10 is a blockchain inspector 48 that allows a third party 44 (or resource owner) to access the blockchain 38 via user interfaces and devices 42. In one embodiment, blockchain inspector 48 allows a user to scan for possible items of interest in the blockchain 38. For example, an artist may be interested in features related to copyright, while a stakeholder interested in privacy may be more concerned with features related to government or third-party inspection of information. Risk levels may also be specified when performing searches (for example, to help users identify possible regions of ToS concern). In one embodiment, the degree of ToS risk or concern can be predicted based on analyzing historical ToS data, real-time evaluation of ToS usage, and other contextual information.

Figure 3:
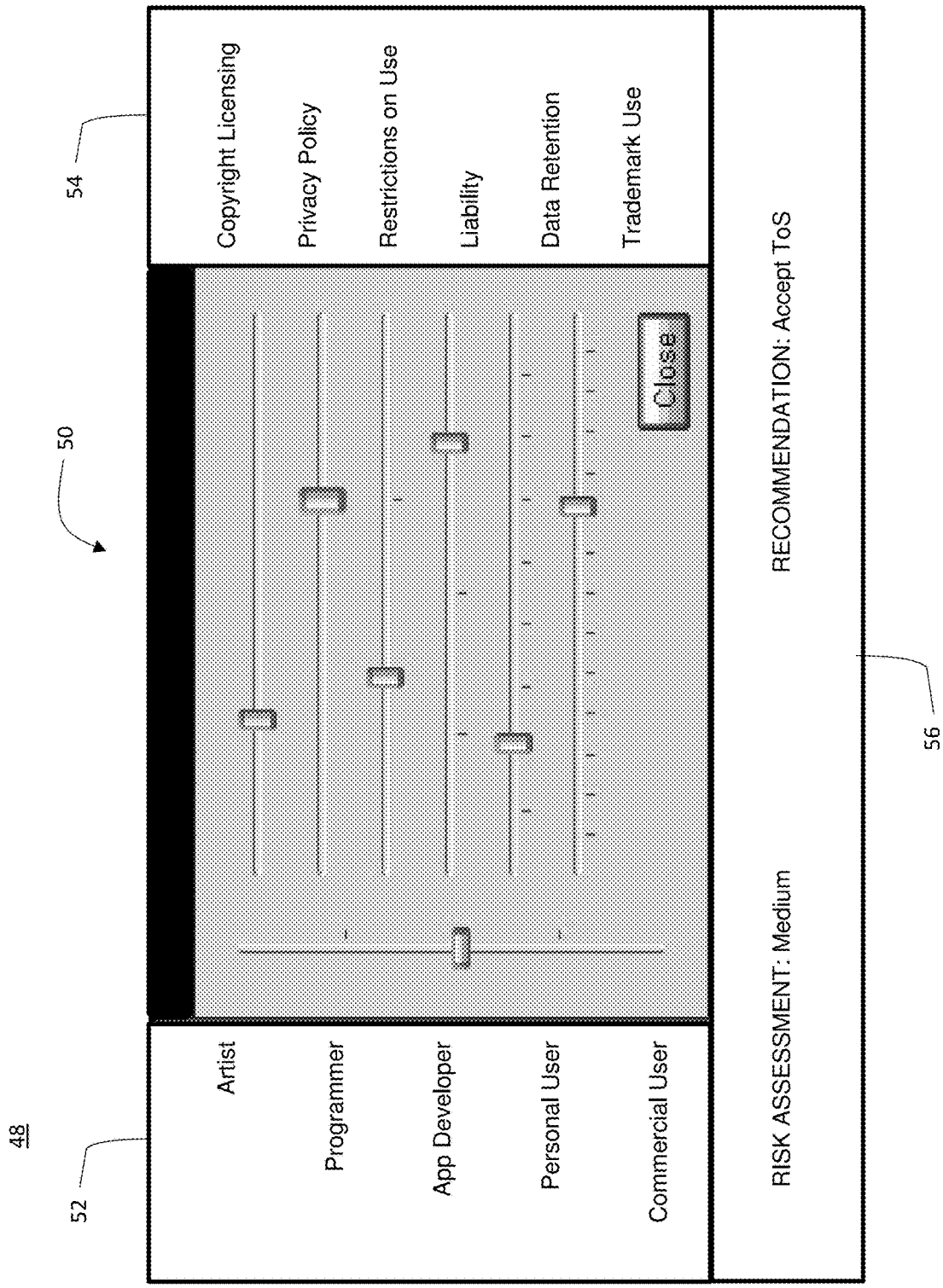
FIG. 3 shows on example of a GUI for inspecting a blockchain according to embodiments.

FIG. 3 depicts a front end of a blockchain inspector 48 that utilizes a GUI 50 with sliders to allow a user to specify six types of risk levels when searching. In this example, sliders specify risk categories 54 for: copyright licensing on user content, privacy policy, restrictions on use (e.g., for an API ToS), liability, etc. The vertical slider, at left, allows a stakeholder to specify a type of user cohort 52, e.g., artist, programmer, commercial app designer, author, personal user, and commercial user. Each slider allows the user to, e.g., specify and scan for ToS terms based on assigned or implied risk values. For example, the user may be concerned with the ability to provide privacy, so the slider value can be set higher to look for ToS terms that place a high burden on maintaining privacy. Identification of such terms may be determined by comparing set risk levels with assigned risk values stored in the blockchain 38.

The GUI 50 may output any type of data such as risk information 56, which in this case includes an overall risk assessment and recommendation. Thus, it is possible for a stakeholder to determine that a ToS for inputted risk levels may be acceptable or unacceptable based on stored risk values. More detailed information may likewise be obtained from the blockchain for the inputted settings, such as the specific ToS terms that are flagged as problematic or risky, alternative available resources that utilize different ToS agreements, etc. Also, a communication may be transmitted back to the responsible ToS provider, e.g., via a trans-vendor service, to provide feedback such as a dissatisfaction with a term in the ToS.

It is understood that ToS platform 18 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 that may comprise any type of computing device and for example includes at least one processor 12, memory 20, an input/output (I/O) 14 (e.g., one or more I/O interfaces and/or devices), and a communications pathway 16. In general, processor(s) 12 execute program code which is at least partially fixed in memory 20. While executing program code, processor(s) 12 can process data, which can result in reading and/or writing transformed data from/to memory and/or I/O 14 for further processing. The pathway 16 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that the ToS platform 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system for implementing a terms of services (ToS) platform, comprising:
   a memory; and
   a central processing unit (CPU) coupled to the memory, the CPU configured to:
      store and update a first ToS for a first resource according to a defined format in a blockchain, the first ToS including a term;
      assign a first risk value to the term;
      detect a transaction;
      compose, based on the first risk value, details associated with the transaction;
      determine a second risk value associated with the transaction;
      compare the second risk value to a threshold;
      adjust, based on the comparing, a rate of adding blocks to the blockchain; and
      store the details in the blockchain based on the adjusted rate.

2. The system of claim 1, wherein wherein the CPU is further configured to issue an alert in response to an invalid detected transaction, wherein an alert type of the alert is dependent on the first risk value.

3. The system of claim 1, wherein the CPU is configured to detect transactions for a group of composite resources and identifies a responsible ToS.

4. The system of claim 1, wherein the first resource comprises one of an application programming interface (API) and a cloud platform.

5. The system of claim 1, wherein the CPU is further configured to:
   provide a user interface to enable a user to search the blockchain based on risk values of ToS terms;
   receive, via the user interface, a user input specifying a type of risk value; and
   output, based on the type and the first risk value, a risk assessment.

6. The system of claim 1, wherein the CPU is further configured to store and update a second ToS for a second resource according to the defined format in the blockchain.

7. The system of claim 1, wherein the CPU is further configured to:
   determine that the transaction is associated with the first resource; and
   validate, based on the determining, the transaction relative to the first ToS.

8. A method of implementing a terms of services (ToS) platform, comprising:
   storing a first ToS for a first resource according to a defined format in a blockchain, the first ToS including a term;
   assigning a first risk value to the term;
   detecting a transaction;
   composing, based on the first risk value, details associated with the transaction;
   determining a second risk value associated with the transaction;
   comparing the second risk value to a threshold;
   adjusting, based on the comparing, a rate of adding blocks to the blockchain; and
   storing the details in the blockchain based on the adjusted rate.

9. The method of claim 8, further comprising issuing an alert in response to an invalid detected transaction, wherein an alert type of the alert is dependent on the first risk value.

10. The method of claim 8, further comprising detecting transactions for a group of composite resources and identifies a responsible ToS.

11. The method of claim 8, wherein the first resource comprises one of an application programming interface (API) and a cloud platform.

12. The method of claim 8, further comprising:
    providing a user interface to enable a user to search the blockchain based on risk values of ToS terms;
    receiving, via the user interface, a user input specifying a type of risk value; and
    outputting, based on the type and the first risk value, a risk assessment.

13. The method of claim 8, further comprising storing and updating a second ToS for a second resource according to the defined format in the blockchain.

14. The method of claim 8, further comprising:
    determining that the transaction is associated with the first resource; and
    validating, based on the determining, the transaction relative to the first ToS.

15. A non-transitory computer readable storage medium having instructions recorded thereon, which when executed by a computing system, cause the computing system to perform operations comprising:
    store and update a first ToS for a first resource according to a defined format in a blockchain, the first ToS including a term;
    assign a first risk value to the term;
    detect a transaction;
    compose, based on the first risk value, details associated with the transaction;
    determine a second risk value associated with the transaction;
    compare the second risk value to a threshold;
    adjust, based on the comparing, a rate of adding blocks to the blockchain; and
    store the details in the blockchain based on the adjusted rate.

16. The non-transitory computer readable storage medium of claim 15, wherein the instructions, when executed by the computing system, further cause the computing system to issue an alert in response to an invalid detected transaction, wherein an alert type of the alert is dependent on the first risk value.

17. The non-transitory computer readable storage medium of claim 15, wherein the first resource comprises one of an application programming interface (API) and a cloud platform.

18. The non-transitory computer readable storage medium of claim 15, wherein the instructions, when executed by the computing system, further cause the computing system to detect transactions for a group of composite resources and identifies a responsible ToS.

19. The non-transitory computer readable storage medium of claim 15, wherein the instructions, when executed by the computing system, further cause the computing system to:
provide a user interface to enable a user to search the blockchain based on risk values of ToS terms;
receive, via the user interface, a user input specifying a type of risk value; and
output, based on the type and the first risk value, a risk assessment.

20. The non-transitory computer readable storage medium of claim 15, wherein the instructions, when executed by the computing system, further cause the computing system to:
determine that the transaction is associated with the first resource; and
validate, based on the determining, the transaction relative to the first ToS.

\* \* \* \* \*